United States Patent
Xu et al.

(10) Patent No.: US 11,877,310 B2
(45) Date of Patent: Jan. 16, 2024

(54) INFORMATION MEASUREMENT METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Weijie Xu, Guangdong (CN); Ning Yang, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 75 days.

(21) Appl. No.: 17/116,449

(22) Filed: Dec. 9, 2020

(65) Prior Publication Data
US 2021/0120562 A1     Apr. 22, 2021

Related U.S. Application Data

(63) Continuation of application No. PCT/CN2018/108152, filed on Sep. 27, 2018.

(30) Foreign Application Priority Data

Jun. 22, 2018  (WO) ............... PCT/CN2018/092498

(51) Int. Cl.
*H04W 72/54*    (2023.01)
*H04W 56/00*    (2009.01)
(Continued)

(52) U.S. Cl.
CPC ....... *H04W 72/542* (2023.01); *H04W 56/001* (2013.01); *H04W 72/044* (2013.01); *H04W 72/541* (2023.01)

(58) Field of Classification Search
CPC ......... H04W 36/0094; H04W 36/0088; H04W 24/10
See application file for complete search history.

(56) References Cited

U.S. PATENT DOCUMENTS

| | | |
|---|---|---|
| 2008/0032677 A1 | 2/2008 | Catovic et al. |
| 2015/0195735 A1 | 7/2015 | Deng et al. |
| | (Continued) | |

FOREIGN PATENT DOCUMENTS

| | | |
|---|---|---|
| CN | 101572948 A | 11/2009 |
| CN | 101572948 B | 5/2011 |
| | (Continued) | |

OTHER PUBLICATIONS

Extended European Search Report for Application No. 18923029.5 dated Oct. 4, 2021. 14 pages.
(Continued)

*Primary Examiner* — Yee F Lam
(74) *Attorney, Agent, or Firm* — PERKINS COIE LLP

(57) ABSTRACT

Provided by the implementations of the present disclosure are an information measurement method, a terminal device, and a network device. The method comprises: a network device receiving first information sent by a terminal device, the first information comprising state information of the terminal device; the network device configuring RRM measurement for the terminal device after receiving the first information.

20 Claims, 5 Drawing Sheets

500  A terminal device receives first information sent by a network device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and RRM measurement configuration information, and the second corresponding relationship indicates a corresponding relationship between channel quality information of a cell where the terminal device resides and the RRM measurement configuration information ~ S510

The terminal device determines the RRM measurement configuration information according to the first information ~ S520

(51) Int. Cl.
*H04W 72/04* (2023.01)
*H04W 72/541* (2023.01)
*H04W 72/542* (2023.01)
*H04W 72/044* (2023.01)

(56) References Cited

U.S. PATENT DOCUMENTS

| | | | |
|---|---|---|---|
| 2017/0026861 A1 | 1/2017 | Tseng et al. | |
| 2018/0198585 A1* | 7/2018 | Lin | H04L 5/0053 |
| 2018/0368035 A1* | 12/2018 | Huang | H04W 36/0088 |
| 2019/0052379 A1* | 2/2019 | Lin | H04L 27/26 |
| 2019/0166513 A1* | 5/2019 | Lin | H04W 24/10 |
| 2019/0253906 A1* | 8/2019 | Lin | H04L 5/0053 |

FOREIGN PATENT DOCUMENTS

| | | |
|---|---|---|
| CN | 102638840 A | 8/2012 |
| CN | 102647766 A | 8/2012 |
| CN | 102740349 A | 10/2012 |
| CN | 102917380 | 2/2013 |
| CN | 103107873 A | 5/2013 |
| CN | 103167551 A | 6/2013 |
| CN | 102917380 B | 12/2015 |
| CN | 107852631 A | 3/2018 |
| EP | 2533562 A1 | 12/2012 |
| EP | 2665329 A1 | 11/2013 |
| EP | 2747474 A1 | 6/2014 |
| EP | 3358884 A1 | 8/2018 |
| WO | 2011083801 A1 | 7/2011 |
| WO | 2013107410 A1 | 7/2013 |
| WO | 2017056425 A1 | 4/2017 |
| WO | 2017167918 A1 | 10/2017 |
| WO | 2018062845 A1 | 4/2018 |

OTHER PUBLICATIONS

Examination Report of the Taiwanese application No. 108121679, dated Jul. 12, 2022. 19 pages with English Translation.
First Examination Report of the European application No. 18923029.5, dated Jun. 2, 2022. 5 pages.
Nokia et al. "Further discussion on RLM requirements for NR", R4-1710653; 3GPP TSG-RAN WG4 #84bis; Dubrovnik, Croatia, Oct. 9-13, 2017. 4 pages.
Notice of Reasons for Refusal of the Japanese application No. 2020-568552, dated Jul. 12, 2022. 8 pages with English Translation.
Examination Report for Indian Application No. 202117001306 dated Jan. 5, 2022. 6 pages with English translation.
EPO, partial supplementary European Search Report for European Application No. 18923029.5. dated Jul. 2, 2021. 15 pages.
NTT Docomo, Inc. "Discussion on intra-frequency measurement requirements" R4-1713015; 3GPP TSF RAN WG4 Meeting NR #85; Reno, Nevada, USA; Nov. 27-Dec. 1, 2017. 2 pages.
International Search Report dated Feb. 19, 2019 of PCT/CN2018/092498 (4 pages).
International Search Report dated Feb. 27, 2019 of PCT/CN2018/108152 (4 pages).
Decision of Refusal for Japanese Application No. 2020-568552 dated Nov. 22, 2022. 7 pages with English translation.
Examination Report for European Application No. 18923029.5 dated Dec. 2, 2022. 8 pages.
Extended European Search Report for European Application No. 22205656.6 dated Feb. 8, 2023. 12 pages.
Nokia et al. "Physical layer procedure enhancements for NR unlicensed" R1-1804277; 3GPP TSG RAN WG1 Meeting #92bis; Sanya, China; Apr. 16-20, 2018. 5 pages.
Oral Proceedings of the European application No. 18923029.5, issued on May 19, 2023. 11 pages.
First Office Action of the Chinese application No. 202210839911.8, dated Jul. 15, 2023. 20 pages with English translation.
Summons to attend oral proceedings for European application No. 18923029.5 dated Oct. 26, 2023, 13 Pages.
Office Action for Taiwan application No. 108121679 dated Sep. 4, 2023, 16 pages with English Translation.
Notice of Allowance for Chinese application No. 2022108399118 dated Sep. 28, 2023, 4 Pages with English Translation.
VIVO; " SS block transmissions and RRM measurement in wideband CC";R1-1710374; 3GPP TSG RAN WG1 NR Ad-Hoc Meeting #2, Qingdao, P.R. China, Jun. 27-30, 2017, 4 Pages.

* cited by examiner

INFORMATION MEASUREMENT METHOD, TERMINAL DEVICE, AND NETWORK DEVICE

CROSS-REFERENCE TO RELATED APPLICATION

This application is a continuation application of International PCT Application No. PCT/CN2018/108152 filed on Sep. 27, 2018, which claims the priority to International PCT Application No. PCT/CN2018/092498 filed on Jun. 22, 2018, and the entire contents of both applications are hereby incorporated by reference.

TECHNICAL FIELD

Implementations of the present disclosure relate to the field of wireless communication, and more particularly, to information measurement methods, terminal devices, and network devices.

BACKGROUND

In a radio resource control (RRC) connected state, a terminal device needs to continuously make radio resource management (RRM) measurements of a serving cell and other cells based on network configuration to support mobility operations, such as handover.

However, a network device performs RRM measurement configuration on the terminal device according to its own decision without fully considering status information of the terminal device, thus causing some terminal devices to continuously make measurements, but these measurements may be unnecessary. For example, when the terminal device is in a static status for a period of time, there is no change in a positional relationship between a target cell to be measured including the serving cell and the terminal device, so there will be no change in continuous measurement results of the terminal device, thus these measurements are of little significance, but waste the power consumption of the terminal device.

SUMMARY

Implementations of the present disclosure provide information measurement methods, terminal devices and network devices.

In a first aspect, there is provided an information measurement method, which includes:
  a network device receiving first information sent by a terminal device, the first information including status information of the terminal device; and
  the network device performing RRM measurement configuration on the terminal device after receiving the first information.

In a second aspect, there is provided an information measurement method, which includes:
  a terminal device sending first information to a network device, the first information including status information of the terminal device; and
  the terminal device receiving RRM measurement configuration information sent by the network device after sending the first information, and performing RRM measurement according to the RRM measurement configuration information.

In a third aspect, there is provided an information measurement method, which comprises:
  a network device sending first information to a terminal device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and RRM measurement configuration information, and the second corresponding relationship indicates a corresponding relationship between channel quality information of a cell where the terminal device resides and the RRM measurement configuration information.

In a fourth aspect, there is provided an information measurement method, which comprises:
  a terminal device receiving first information sent by a network device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and RRM measurement configuration information, and the second corresponding relationship indicates a corresponding relationship between channel quality information of a cell where the terminal device resides and the RRM measurement configuration information; and
  the terminal device determining the RRM measurement configuration information according to the first information.

In a fifth aspect, there is provided a network device used for executing the method according to the first aspect described above or various implementations thereof.

Specifically, the network device includes function modules used for executing the method according to the first aspect described above or various implementations thereof.

In a sixth aspect, there is provided a terminal device used for executing the method according to the second aspect described above or various implementations thereof.

Specifically, the terminal device includes function modules used for executing the method according to the second aspect described above or various implementations thereof.

In a seventh aspect, there is provided a network device used for executing the method according to the third aspect described above or various implementations thereof.

Specifically, the network device includes function modules used for executing the method according to the third aspect described above or various implementations thereof.

In an eighth aspect, there is provided a terminal device used for executing the method according to the fourth aspect described above or various implementations thereof.

Specifically, the terminal device includes function modules used for executing the method according to the fourth aspect described above or various implementations thereof.

In a ninth aspect, there is provided a network device including a processor and a memory. The memory is used for storing a computer program, and the processor is used for calling and running the computer program stored in the memory to execute the method according to the first aspect described above or various implementations thereof.

In a tenth aspect, there is provided a terminal device including a processor and a memory. The memory is used for storing a computer program, and the processor is used for calling and running the computer program stored in the memory to execute the method according to the second aspect described above or various implementations thereof.

In an eleventh aspect, there is provided a network device including a processor and a memory. The memory is used for storing a computer program, and the processor is used for calling and running the computer program stored in the memory to execute the method according to the third aspect described above or various implementations thereof.

In a twelfth aspect, there is provided a terminal device including a processor and a memory. The memory is used for storing a computer program and the processor is used for calling and running the computer program stored in the memory to execute the method according to the fourth aspect described above or various implementations thereof.

In a thirteenth aspect, there is provided a chip used for implementing the method according to any one of the first aspect to the fourth aspect described above or various implementations thereof.

Specifically, the chip includes a processor, used for calling and running a computer program from a memory, so that a device with the chip installed therein performs the method according to any one of the first aspect to the fourth aspect described above or various implementations thereof.

In a fourteenth aspect, there is provided a computer readable storage medium used for storing a computer program that causes a computer to execute the method according to any one of the first aspect to the fourth aspect described above or various implementations thereof.

In a fifteenth aspect, there is provided a computer program product comprising computer program instructions that cause a computer to execute the method according to any one of the first aspect to the fourth aspect described above or various implementations thereof.

In a sixteenth aspect, there is provided a computer program which, when being run on a computer, causes the computer to execute the method according to any one of the first aspect to the fourth aspect described above or various implementations thereof.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system, or subsequent versions of the communication system.

Figure 1:
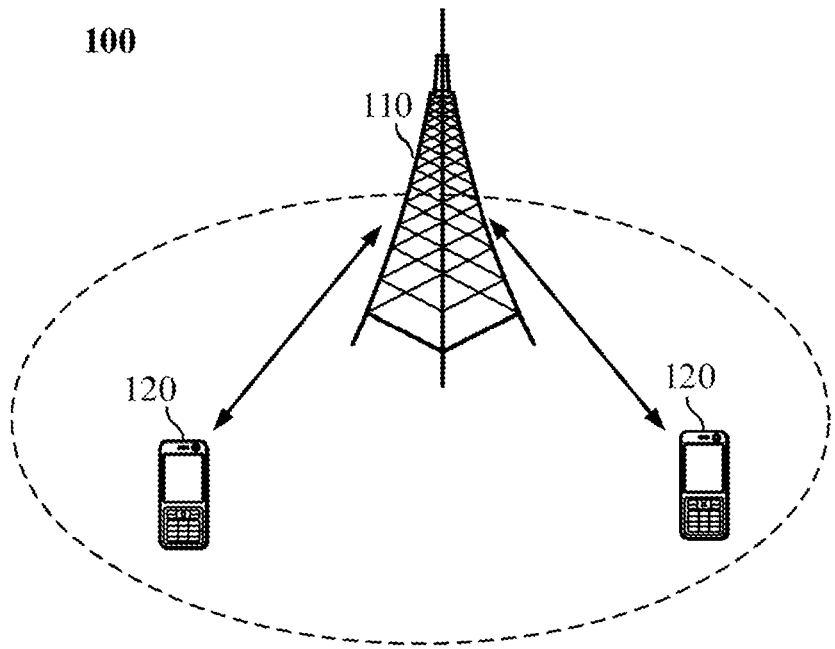
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110, which may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, a network device in a 5G network, or a network device in a future evolved Public Land Mobile Network (PLMN), etc.

The communication system 100 also includes at least one terminal device 120 located within the coverage area of the network device 110. The "terminal device" as used herein includes, but not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation-frequency modulation (AM-FM) broadcast transmitter; and/or an apparatus of another terminal device configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone; a personal communication system (PCS) terminal capable of combining a cellular wireless telephone with data processing, facsimile, and data communication abilities; a personal digital assistant (PDA) that may include a radio telephone, a pager, internet/intranet access, a Web browser, a memo pad, a calendar, a BeiDou Navigation Satellite System (BDS) and Global Positioning System (GPS) receiver; and a conventional laptop and/or palmtop receiver or other electronic devices including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, device to device (D2D) communication may be established between the terminal devices 120.

Optionally, the 5G system or 5G network may be referred to as a new radio (NR) system or an NR network.

FIG. 1 illustrates schematically one network device and two terminal devices. Optionally, the wireless communication system 100 may include multiple network devices, and other numbers of terminal devices may be included within the coverage area of each network device, and the implementations of the present disclosure are not limited thereto.

Optionally, the communication system 100 may include other network entities, such as a network controller and a mobile management entity. The Implementations of the present disclosure are not limited thereto.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as other network entities like network controllers and mobile management entities, and the implementations of the present disclosure are not limited thereto.

It should be understood that the terms "system" and "network" are often used interchangeably herein. The term "and/or" herein describes an association relationship between associated objects only, indicating that there may be three relationships, for example, A and/or B may indicate three cases: A alone, A and B, and B alone. In addition, the symbol "/" herein generally indicates that there is a "or" relationship between the associated objects before and after "/".

Figure 2:
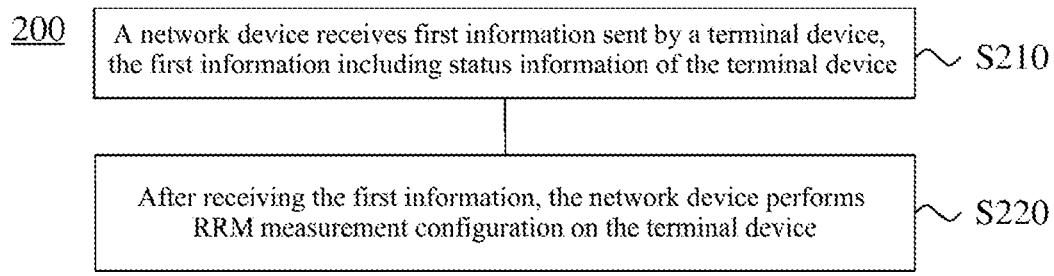
FIG. 2 is a schematic flow chart of an information measurement method according to an implementation of the present disclosure.

FIG. 2 is a schematic flow chart of an information measurement method 200 according to an implementation of the present disclosure.

In S210, a network device receives first information sent by a terminal device, the first information including status information of the terminal device.

Optionally, the status information of the terminal device may include current mobile status information of the terminal device or channel quality information of a cell where the terminal device resides.

Specifically, the terminal device can quantify its own mobile status. For example, a static status, a low-speed mobile status, a medium-speed mobile status and a high-speed mobile status are represented by identification information 1, 2, 3 and 4, respectively. At this time, the terminal device can report identification information 4 to indicate that it is currently in the high-speed mobile status.

It should be noted that the current mobile status information of the terminal device can be obtained by the terminal device according to a positioning navigation system and/or measurement perception of network signals. In other words, the terminal device can perceive the current mobile status information according to the positioning navigation system and/or the measurement of the network signals.

Specifically, the terminal device can quantify channel quality of the cell. For example, excellent channel quality, good channel quality and poor channel quality are represented by identification information a, b and c, respectively. At this time, the terminal device can report the identification information a to indicate that the channel quality of the resident cell is excellent.

It should be noted that the channel quality information of the cell where the terminal device resides is at least one of reference signal receiving quality (RSRQ), interference plus noise ratio (SINR) and reference signal receiving power (RSRP).

In S220, after receiving the first information, the network device performs RRM measurement configuration on the terminal device.

Optionally, the network device performs the RRM measurement configuration on the terminal device according to the first information.

For example, the network device may perform the RRM measurement configuration on the terminal device based on its own status and with reference to a first channel.

Optionally, the RRM measurement configuration includes at least a measurement period, and may also include a measurement time-frequency resource, for example.

Optionally, the RRM measurement configuration may also include some measurement reporting configurations, for example, the RRM measurement configuration may also include a measurement reporting period.

It should be understood that the measurement period may be a synchronization signal block based RRM measurement timing configuration (SMTC) period in an NR system.

Specifically, when the first information includes the current mobile status information of the terminal device, the network device performs the RRM measurement configuration on the terminal device according to the first information and a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

It should be noted that the terminal device may be in different mobile statuses: the static status, the low-speed mobile status, the medium-speed mobile status, the high-speed mobile status, etc. For terminal devices in different mobile statuses, times and frequencies of measurements for cells to be measured, including a serving cell, may be different. For example, for a terminal device in the static status, there is no change in a relative position relationship between the terminal device and a target cell to be measured, including the serving cell, so basically no change or only few changes will occur in signals received by the terminal device from the target cell to be measured over a period of time. Therefore, even if the network device configures dense measurement frequency for the terminal device, the difference between multiple measurement results will be small. When these results are reported to the network device, for the network device, there is basically no incremental information brought to the network device between the results reported many times. Therefore, a reasonable processing way is that for a static terminal device, the frequency of measurement and the frequency of reporting the measurement results may be decreased moderately to reduce the measured power consumption of the terminal device. On the contrary, for a terminal device moving at a high speed, the position of the terminal device is constantly changing at a high speed, and the quality of the received signal from the serving cell and adjacent cells is also changing rapidly. At this time, in order to track the rapid change of the signal in time, the terminal device needs to make measurements at a higher time frequency and report the measurement results quickly and densely.

Therefore, the terminal device can report its own mobile status information to the network device, so that the network device can perform RRM measurement configuration in combination with the mobile status of the terminal device. The lower the moving speed of the terminal device is, the longer the configured measurement period (SMTC period of the NR system) and/or the measurement reporting period can be. On the contrary, the higher the moving speed of the terminal device is, the shorter the configured measurement period (SMTC period of the NR system) and/or the measurement reporting period can be.

Specifically, when the first information includes the channel quality information of the cell where the terminal device resides, the network device performs the RRM measurement configuration on the terminal device according to the first information and a second rule.

Specifically, the second rule is that: the network device configures the first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

It should be noted that the channel quality measured by the terminal device is different for different cells. For cells with higher channel quality, due to good signal quality, the terminal device can obtain satisfactory measurement accuracy based on a small number of signals. For cells with lower channel quality, due to poor signal quality, the terminal device may obtain measurement accuracy meeting requirements based on a large number of signals. Therefore, for cells with different channel qualities, the network device may require the terminal device to make measurements with different measurement periods and/or make reports with different measurement reporting periods.

Optionally, when the first information includes the channel quality information of the cell where the terminal device resides, the network device performing the RRM measurement configuration on the terminal device according to the first information comprises:

the network device dividing cells with different channel quality information into a plurality of cell groups according to the channel quality information, the cells in each cell group having the same channel quality information or similar channel quality information;

the network device configuring one piece of RRM measurement configuration information for each cell group; and the network device determining the RRM measurement configuration information corresponding to the terminal device according to the channel quality information of the cell where the terminal device resides.

It should be noted that the network device configures larger measurement period and smaller measurement bandwidth and/or configures larger measurement reporting period for cells with good channel quality, and configures smaller measurement period and larger measurement bandwidth and/or configures smaller measurement reporting period for cells with poor channel quality.

Specifically, based on the channel quality information (such as RSRQ, SINR, RSRP) of the cells, the network device can divide the cells with different channel qualities into multiple groups, each group corresponding to one piece of RRM measurement configuration information, and determine the RRM measurement configuration information corresponding to the terminal device according to the channel quality information of the resident cell reported by the terminal device while sending the RRM measurement configuration information corresponding to the terminal device to the terminal device.

Therefore, in the implementation of the present disclosure, the network device performs the RRM measurement configuration on the terminal device after receiving the status information reported by the terminal device, so that the network device can make reference to the status information reported by the terminal device when performing the RRM measurement configuration, thereby avoiding unnecessary measurements by the terminal device and reducing the power consumption of the terminal device.

Figure 3:
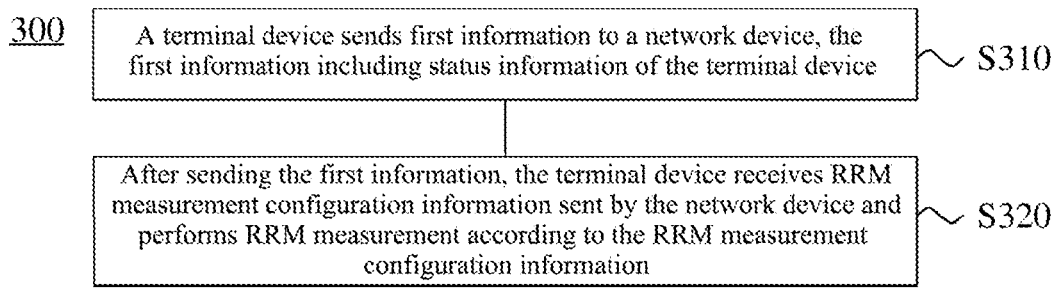
FIG. 3 is a schematic flow chart of another information measurement method according to an implementation of the present disclosure.

FIG. 3 is a schematic flow chart of an information measurement method 300 according to an implementation of the present disclosure.

In S310, a terminal device sends first information to a network device, the first information including status information of the terminal device.

Optionally, the status information of the terminal device includes current mobile status information of the terminal device or channel quality information of a cell where the terminal device resides.

Optionally, the terminal device determines the current mobile status information of the terminal device according to a positioning navigation system and/or measurement perception of network signals.

It should be noted that the channel quality information of the cell where the terminal device resides is at least one of RSRQ, SINR and RSRP.

In S320, after sending the first information, the terminal device receives RRM measurement configuration information sent by the network device, and performs RRM measurement according to the RRM measurement configuration information.

Optionally, the RRM measurement configuration information at least includes a measurement period, and may also include a measurement time-frequency resource, for example.

Optionally, the RRM measurement configuration information may also include some measurement reporting configuration. For example, the RRM measurement configuration may also include a measurement reporting period.

Optionally, the RRM measurement configuration information is associated with the first information.

Specifically, the RRM measurement configuration information may be determined by the network device according to the first information.

For example, the network device may perform the RRM measurement configuration on the terminal device based on its own status and with reference to a first channel.

Specifically, when the first information includes the current mobile status information of the terminal device, the RRM measurement configuration information is configuration information that is used by the network device to perform the RRM measurement configuration on the terminal device according to the first information and a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Specifically, when the first information includes the channel quality information of the cell where the terminal device resides, the RRM measurement configuration information is configuration information that is used by the network device to perform the RRM measurement configuration on the terminal device according to the first information and a second rule.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period in an NR system.

It should be understood that the steps in the information measurement method 300 can be described with reference to the corresponding steps in the information measurement method 200, and will not be repeated herein for brevity.

Therefore, in the implementation of the present disclosure, the terminal device receives the RRM measurement configuration of the network device after reporting the status information, so that the network device can make reference to the status information reported by the terminal device when performing the RRM measurement configuration, thereby avoiding unnecessary measurements by the terminal device and reducing the power consumption of the terminal device.

Figures 4, 5:
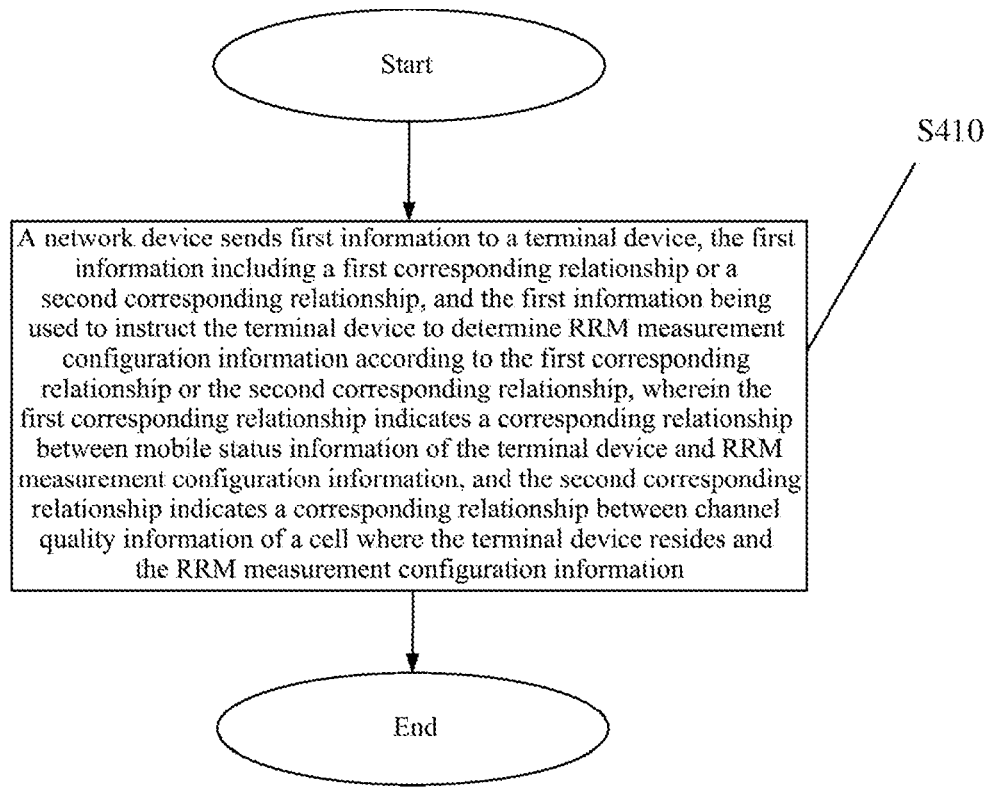
FIG. 4 is a schematic flow chart of still another information measurement method according to an implementation of the present disclosure.
FIG. 5 is a schematic flow chart of yet another information measurement method according to an implementation of the present disclosure.

FIG. 4 is a schematic flow chart of an information measurement method 400 according to an implementation of the present disclosure.

In S410, a network device sends first information to a terminal device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and RRM measurement configuration information, and the second corresponding relationship indicates a corresponding relationship between channel quality information of a cell where the terminal device resides and the RRM measurement configuration information.

It should be noted that after receiving the first information, the terminal device can determine the RRM measurement configuration information (at least one of RRM measurement period, RRM measurement bandwidth and RRM measurement reporting period) according to the first corresponding relationship and in combination with current mobile status information, or can determine the RRM measurement configuration information (at least one of RRM measurement period, RRM measurement bandwidth and RRM measurement reporting period) according to the second corresponding relationship and in combination with channel quality information of a resident cell.

Optionally, the RRM measurement configuration information at least includes a measurement period, and may also include a measurement time-frequency resource, for example.

Optionally, the RRM measurement configuration information may also include some measurement reporting configurations. For example, the RRM measurement configuration may also include a measurement reporting period.

The channel quality information of the cell where the terminal device resides is at least one of RSRQ, SINR and RSRP.

Specifically, when the first information includes the first corresponding relationship, the network device determines the first corresponding relationship according to a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Specifically, when the first information includes the second corresponding relationship, the network device determines the second corresponding relationship according to a second rule.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period. Specifically, the measurement period may be an SMTC period in an NR system.

Optionally, the network device may send the first information to the terminal device through system broadcast.

Specifically, the first information is remaining system information (RMSI) or other system information (OSI).

Optionally, the terminal device is in a radio resource control (RRC) idle state or RRC connected state.

It should be understood that the steps in the information measurement method 400 can be described with reference to the corresponding steps in the information measurement method 200, and will not be repeated herein for brevity.

Therefore, in the implementation of the present disclosure, the network device broadcasts the first information including the first corresponding relationship or the second corresponding relationship, and the terminal device can determine the RRM measurement configuration information based on the current mobile status information and the first corresponding relationship, or can determine the RRM measurement configuration information based on the channel quality information of the resident cell and the second corresponding relationship, thereby avoiding unnecessary measurements by the terminal device and reducing the power consumption of the terminal device.

FIG. 5 is a schematic flow chart of an information measurement method 500 according to an implementation of the present disclosure.

In S510, a terminal device receives first information sent by a network device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and RRM measurement configuration information, and the second corresponding relationship indicates a corresponding relationship between channel quality information of a cell where the terminal device resides and the RRM measurement configuration information.

Optionally, the RRM measurement configuration information at least includes a measurement period, and may also include a measurement time-frequency resource, for example.

Optionally, the RRM measurement configuration information may also include some measurement reporting configurations. For example, the RRM measurement configuration may also include a measurement reporting period.

Specifically, the terminal device receives the first information sent by the network device through system broadcast.

Optionally, the first information is RMSI or OSI.

The channel quality information of the cell where the terminal device resides is at least one of RSRQ, SINR and RSRP.

Optionally, the terminal device is in an RRC idle state or RRC connected state.

In S520, the terminal device determines the RRM measurement configuration information according to the first information.

Specifically, when the first information includes the first corresponding relationship, the terminal device determines the RRM measurement configuration information according to the current mobile status information and the first corresponding relationship.

Specifically, when the first information includes the second corresponding relationship, the terminal device determines the RRM measurement configuration information according to the channel quality information of the resident cell and the second corresponding relationship.

It should be noted that the first corresponding relationship is determined by the network device according to a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

It should be noted that the second corresponding relationship is determined by the network device according to a second rule.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period.

It should be understood that the steps in the information measurement method 500 can be described with reference to the corresponding steps in the information measurement method 200, and will not be repeated herein for brevity.

Therefore, in the implementation of the present disclosure, the terminal device receives the first information including the first corresponding relationship or the second corresponding relationship broadcasted by the network device, and the terminal device can determine the RRM measurement configuration information based on the current mobile status information and the first corresponding relationship, or can determine the RRM measurement configuration information based on the channel quality information of the resident cell and the second corresponding relationship, thereby avoiding unnecessary measurements by the terminal device and reducing the power consumption of the terminal device.

Figure 6:
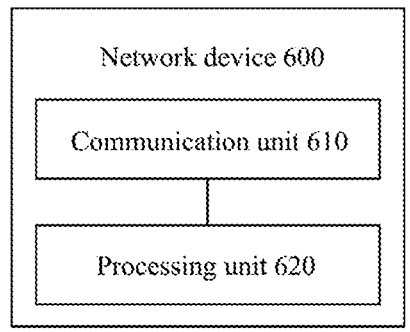
FIG. 6 is a schematic block diagram of a network device according to an implementation of the present disclosure.

FIG. 6 is a schematic block diagram of a network device 600 according to an implementation of this application. As shown in FIG. 6, the network device 600 includes a communication unit 610 and a processing unit 620.

The communication unit 610 is configured to receive first information sent by a terminal device, the first information including status information of the terminal device.

The processing unit 620 is configured to perform RRM measurement configuration on the terminal device after the communication unit receives the first information.

Optionally, the processing unit 620 is specifically configured to perform the RRM measurement configuration on the terminal device according to the first information.

Optionally, the status information of the terminal device includes current mobile status information of the terminal device or channel quality information of a cell where the terminal device resides.

Optionally, the RRM measurement configuration information includes at least one of a measurement period, a measurement time-frequency resource and a measurement reporting period.

Optionally, the processing unit 620 is specifically configured to: perform the RRM measurement configuration on the terminal device according to the first information and a first rule when the first information includes the current mobile status information of the terminal device.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the processing unit 620 is specifically configured to: perform the RRM measurement configuration on the terminal device according to the first information and a second rule when the first information includes the channel quality information of the cell where the terminal device resides.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period.

Optionally, when the first information includes the channel quality information of the cell where the terminal device resides, the processing unit 620 is specifically configured to: divide cells with different channel quality information into a plurality of cell groups according to the channel quality information, the cells in each cell group having the same channel quality information or similar channel quality information; configure one piece of RRM measurement configuration information for each cell group; and determine the RRM measurement configuration information corresponding to the terminal device according to the channel quality information of the cell where the terminal device resides.

Optionally, the current mobile status information of the terminal device is obtained by the terminal device according to a positioning navigation system and/or measurement perception of network signals.

Optionally, the channel quality information of the cell where the terminal device resides is at least one of RSRQ, SINR and RSRP.

It should be understood that the above-mentioned and other operations and/or functions of various modules in the network device 600 according to the implementation of the present disclosure are described respectively for the purpose of implementing the corresponding processes implemented by the network device in the method 200 in FIG. 2, and will not be repeated herein for brevity.

Figure 7:
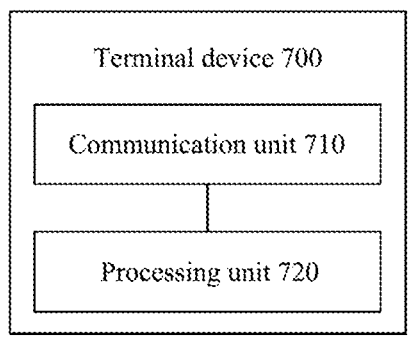
FIG. 7 is a schematic block diagram of a terminal device according to an implementation of the present disclosure.

FIG. 7 is a schematic block diagram of a terminal device 700 according to an implementation of this application. As shown in FIG. 7, the terminal device 700 includes a communication unit 710 and a processing unit 720.

The communication unit 710 is configured to send first information to a network device, the first information including status information of a terminal device.

After the communication unit 710 sends the first information, the communication unit 710 is further configured to receive RRM measurement configuration information sent by the network device.

The processing unit 720 is configured to perform RRM measurement configuration according to the RRM measurement configuration information.

Optionally, the RRM measurement configuration information is associated with the first information.

Optionally, the RRM measurement configuration information includes at least one of a measurement period, a measurement time-frequency resource and a measurement reporting period.

Optionally, the status information of the terminal device includes current mobile status information of the terminal device or channel quality information of a cell where the terminal device resides.

Optionally, when the first information includes the current mobile status information of the terminal device, the RRM measurement configuration information is configuration information that is used by the network device to perform the RRM measurement configuration on the terminal device according to the first information and a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Optionally, before the communication unit 710 sends the first information to the network device, the processing unit 720 is further configured to determine the current mobile status information of the terminal device according to a positioning navigation system and/or measurement perception of network signals.

Optionally, when the first information includes channel quality information of the cell where the terminal device resides, the RRM measurement configuration information is configuration information that is used by the network device to perform the RRM measurement configuration on the terminal device according to the first information and a second rule.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period.

Optionally, the channel quality information of the cell where the terminal device resides is at least one of RSRQ, SINR and RSRP.

It should be understood that the above-mentioned and other operations and/or functions of various modules in the terminal device 700 according to the implementation of the present disclosure are described respectively for the purpose of implementing the corresponding processes implemented by the network device in the method 300 in FIG. 3, and will not be repeated herein for brevity.

Figure 8:
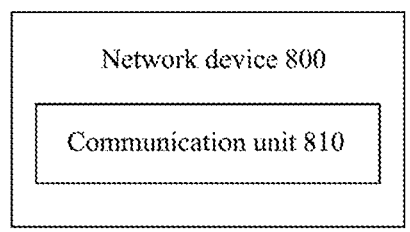
FIG. 8 is a schematic block diagram of a network device according to an implementation of the present disclosure.

FIG. 8 is a schematic block diagram of a network device 800 according to an implementation of this application. As shown in FIG. 8, the network device 800 includes a communication unit 810.

The communication unit 810 is configured to send first information to a terminal device, the first information including a first corresponding relationship or a second corresponding relationship, and the first information being used to instruct the terminal device to determine RRM measurement configuration information according to the first corresponding relationship or the second corresponding relationship.

The first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information.

Optionally, the RRM measurement configuration information includes at least one of a measurement period, a measurement time-frequency resource and a measurement reporting period.

Optionally, before the communication unit 810 sends the first information to the terminal device, the network device further comprises a processing unit 820, configured to determine the first corresponding relationship according to a first rule when the first information includes the first corresponding relationship.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Optionally, before the communication unit 810 sends the first information to the terminal device, the network device 800 further includes a processing unit 820, configured to determine the second corresponding relationship according to a second rule when the first information includes the second corresponding relationship.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period.

Optionally, the communication unit 810 is specifically configured to send the first information to the terminal device through system broadcast.

Optionally, the first information is RMSI or OSI.

Optionally, the terminal device is in an RRC idle state or RRC connected state.

It should be understood that the above-mentioned and other operations and/or functions of various modules in the network device 800 according to the implementation of the present disclosure are described respectively for the purpose of implementing the corresponding processes implemented by the network device in the method 400 in FIG. 4, and will not be repeated herein for brevity.

Figure 9:
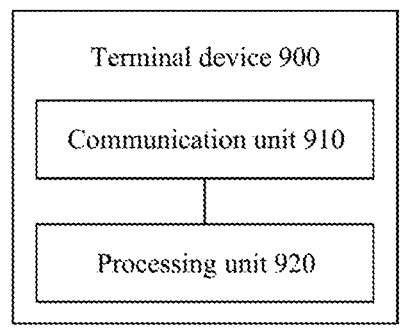
FIG. 9 is a schematic block diagram of a terminal device according to an implementation of the present disclosure.

FIG. 9 is a schematic block diagram of a terminal device 900 according to an implementation of this application. As shown in FIG. 9, the terminal device 900 includes a communication unit 910 and a processing unit 920.

The communication unit 910 is configured to receive first information sent by a network device, the first information including a first corresponding relationship or a second corresponding relationship, and the first information being used to instruct the terminal device to determine RRM measurement configuration information according to the first corresponding relationship or the second corresponding relationship, wherein the first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information.

The processing unit 920 is configured to determine the RRM measurement configuration information according to the first information.

Optionally, the processing unit 920 is specifically configured to determine the RRM measurement configuration information according to current mobile status information and the first corresponding relationship when the first information includes the first corresponding relationship.

Optionally, the processing unit 920 is specifically configured to determine the RRM measurement configuration information according to the channel quality information of the resident cell and the second corresponding relationship when the first information includes the second corresponding relationship.

Optionally, the RRM measurement configuration information includes at least one of a measurement period, a measurement time-frequency resource and a measurement reporting period.

Optionally, the first corresponding relationship is determined by the network device according to a first rule.

Specifically, the first rule is that: the network device configures first RRM measurement configuration information for a terminal device with a first moving speed and configures second RRM measurement configuration information for a terminal device with a second moving speed, and the first moving speed is smaller than the second moving speed, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the second corresponding relationship is determined by the network device according to a second rule.

Specifically, the second rule is that: the network device configures first RRM measurement configuration information for a terminal device residing in a first type cell and configures second RRM measurement configuration information for a terminal device residing in a second type cell, and channel quality of the first type cell is less than that of the second type cell, at least a measurement period in the first RRM measurement configuration information is larger than that in the second RRM measurement configuration information, and/or a measurement reporting period in the first RRM measurement configuration information is larger than that in the second RRM measurement configuration information.

Optionally, the measurement period is an SMTC period.

Optionally, the communication unit 910 is specifically configured to receive the first information sent by the network device through system broadcast.

Optionally, the first information is RMSI or OSI.

Optionally, the terminal device is in an RRC idle status or RRC connected state.

It should be understood that the above-mentioned and other operations and/or functions of various modules in the terminal device 900 according to the implementation of the present disclosure are described respectively for the purpose of implementing the corresponding processes implemented by the network device in the method 500 in FIG. 5, and will not be repeated herein for brevity.

Figure 10:
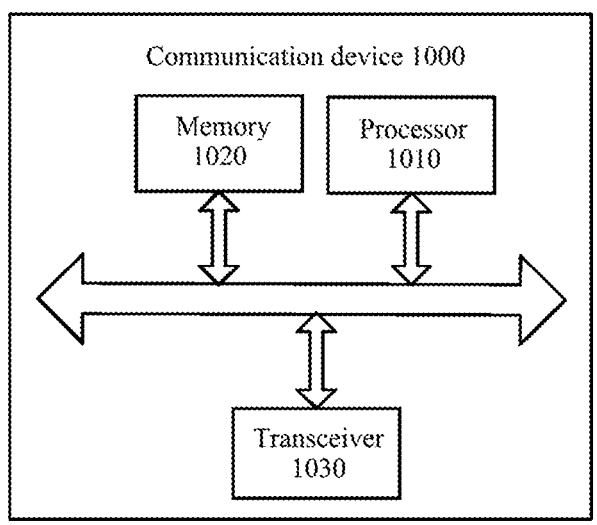
FIG. 10 is a schematic block diagram of a communication device according to an implementation of the present disclosure.

FIG. 10 is a schematic structure diagram of a communication device 1000 according to an implementation of the present disclosure. The communication device 1000 shown in FIG. 10 includes a processor 1010. The processor 1010 may call and run a computer program from a memory to implement the methods in the implementations of the present disclosure.

Optionally, as shown in FIG. 10, the communication device 1000 may further include the memory 1020. The processor 1010 may call and run the computer program from the memory 1020 to implement the methods in the implementations of the present disclosure.

The memory 1020 may be a separate device independent of the processor 1010 or may be integrated in the processor 1010.

Optionally, as shown in FIG. 10, the communication device 1000 may further include a transceiver 1030, and the processor 1010 may control the transceiver 1030 to communicate with other devices. Specifically, information or data may be sent to other devices, or information or data sent by other devices is received.

The transceiver 1030 may include a transmitter and a receiver. The transceiver 1030 may further include antennas, the number of which may be one or more.

Optionally, the communication device 1000 may be specifically the network device according to the implementation of the present disclosure, and the communication device 1000 may implement the corresponding processes implemented by the network device in various methods in the implementations of the present disclosure, and will not be described repeatedly herein for brevity.

Optionally, the communication device 1000 may be specifically the mobile terminal/terminal device according to the implementation of the present disclosure, and the communication device 1000 may implement the corresponding processes implemented by the mobile terminal/terminal device in various methods in the implementations of the present disclosure, and will not be described repeatedly herein for brevity.

Figure 11:
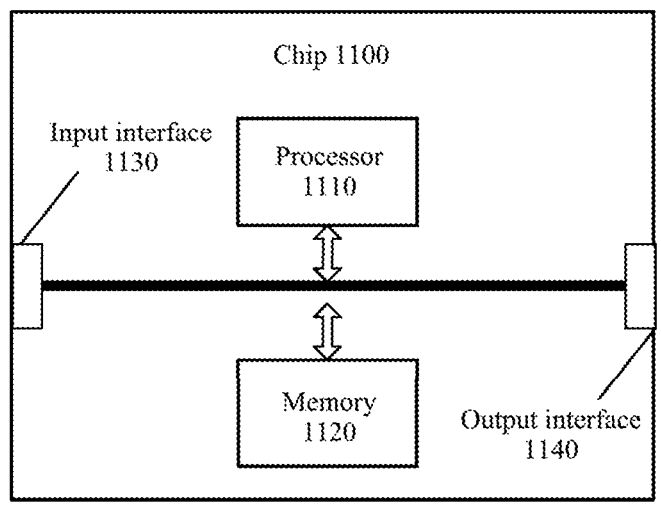
FIG. 11 is a schematic block diagram of a chip according to an implementation of the present disclosure.

FIG. 11 is a schematic structure diagram of a chip according to an implementation of the present disclosure. The chip 1100 shown in FIG. 11 includes a processor 1110. The processor 1110 may call and run a computer program from a memory to implement the methods in the implementations of the present disclosure.

Optionally, as shown in FIG. 11, the chip 1100 may further include the memory 1120. The processor 1110 may call and run the computer program from the memory 1120 to implement the methods in the implementations of the present disclosure.

The memory 1120 may be a separate device independent of the processor 1110 or may be integrated in the processor 1110.

Optionally, the chip 1100 may further include an input interface 1130. The processor 1110 may control the input interface 1130 to communicate with other devices or chips, specifically, may acquire information or data sent by other devices or chips.

Optionally, the chip 1100 may further include an output interface 1140. The processor 1110 may control the output interface 1140 to communicate with other devices or chips, specifically, may output information or data to other devices or chips.

Optionally, the chip may be applied to the network device in the implementations of the present disclosure, and the chip may implement the corresponding processes implemented by the network device in various methods in the implementations of the present disclosure, and will not be described repeatedly herein for brevity.

Optionally, the chip may be applied to the mobile terminal/terminal device in the implementations of the present disclosure, and the chip may implement the corresponding processes implemented by the mobile terminal/terminal device in various methods in the implementations of the present disclosure, and will not be described repeatedly herein for brevity.

It should be understood that the chip mentioned in the implementation of the present disclosure may be referred to as a system-level chip, a system chip, a chip system or a system-on-chip, etc.

Figure 12:
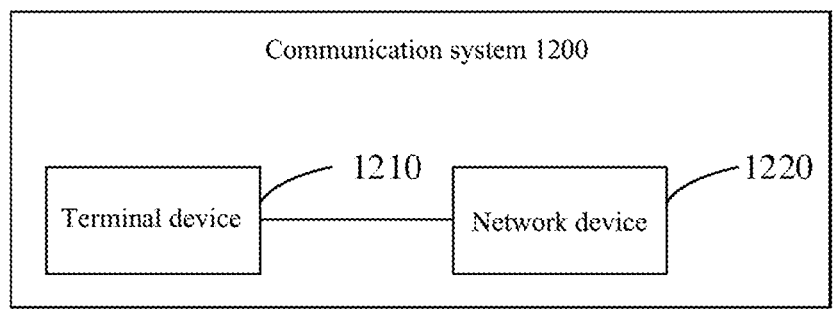
FIG. 12 is a schematic block diagram of a communication system according to an implementation of the present disclosure.

FIG. 12 is a schematic block diagram of a communication system 1200 according to an implementation of the present disclosure. As shown in FIG. 12, the communication system 1200 may include a terminal device 1210 and a network device 1220.

The terminal device 1210 may be configured to implement the corresponding functions implemented by the terminal device in the above-mentioned methods, and the network device 1220 may be configured to implement the corresponding functions implemented by the network device in the above-mentioned methods, and will not be described repeatedly herein for brevity.

It should be understood that the processor in the implementation of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure are intended to include, but not be limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program causes the computer to perform the corresponding processes implemented by the network device in various methods in the implementations of the present disclosure, and will not be described repeatedly for brevity.

Optionally, the computer readable storage medium may be applied to the mobile terminal/terminal device in the implementations of the present disclosure, and the computer program causes the computer to perform the corresponding processes implemented by the mobile terminal/terminal device in various methods in the implementations of the present disclosure, and will not be described repeatedly for brevity.

An implementation of the present disclosure also provides a computer program product including computer program instructions.

Optionally, the computer program product may be applied to the network device in the implementations of the present disclosure, and the computer program instructions cause the computer to perform the corresponding processes implemented by the network device in various methods in the implementations of the present disclosure, and will not be described repeatedly for brevity.

Optionally, the computer program product may be applied to the mobile terminal/terminal device in the implementations of the present disclosure, and the computer program instructions cause the computer to perform the corresponding processes implemented by the mobile terminal/terminal device in various methods in the implementations of the present disclosure, and will not be described repeatedly for brevity.

An implementation of the present disclosure also provides a computer program.

Optionally, the computer program may be applied to the network device in the implementations of the present disclosure. The computer program, when being run on a computer, causes the computer to perform the corresponding processes implemented by the network device in various methods of the implementations of the present disclosure, and will not be described repeatedly for brevity.

Optionally, the computer program may be applied to the mobile terminal/terminal device in the implementations of the present disclosure. The computer program, when being run on a computer, causes the computer to perform the corresponding processes implemented by the mobile terminal/terminal device in various methods in the implementations of the present disclosure, and will not be described repeatedly for brevity.

A person of ordinary skill in the art may recognize that the elements and algorithm steps in various examples described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solution of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A measurement method, comprising:
    receiving, by a terminal device, first information sent by a network device, wherein the first information comprises a first corresponding relationship or a second corresponding relationship, and the first information is used for instructing the terminal device to determine radio resource management (RRM) measurement configuration information according to the first corresponding relationship or the second corresponding relationship, wherein, the first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information; and
    determining, by the terminal device, the RRM measurement configuration information according to the first information;
    wherein the determining, by the terminal device, the RRM measurement configuration information according to the first information comprises:
    when the first information comprises the first corresponding relationship, determining, by the terminal device, the RRM measurement configuration information according to current mobile status information and the first corresponding relationship;
    when the first information comprises the second corresponding relationship, determining, by the terminal device, the RRM measurement configuration information according to the channel quality information of a resident cell and the second corresponding relationship;
    wherein the RRM measurement configuration information comprises a measurement period.

2. The method according to claim 1, wherein the RRM measurement configuration information further comprises:
    at least one of a measurement time-frequency resource and a measurement reporting period.

3. The method according to claim 1, wherein the first corresponding relationship is determined by the network device according to a first rule, wherein,
    the first rule is specifically that: the network device configures first RRM measurement configuration information for a terminal device with a first moving speed and configures second RRM measurement configuration information for a terminal device with a second moving speed, wherein at least one of the following is met: the first moving speed is smaller than the second moving speed, at least the measurement period in the first RRM measurement configuration information is larger than the measurement period in the second RRM measurement configuration information, or a measurement reporting period in the first RRM measurement configuration information is larger than the second RRM measurement configuration information.

4. The method according to claim 1, wherein the second corresponding relationship is determined by the network device according to a second rule, wherein,
    the second rule is specifically that: the network device configures first RRM measurement configuration information for a terminal device residing in a first type cell and configures second RRM measurement configuration information for a terminal device residing in a second type cell, and at least one of the following is met: channel quality of the first type cell is smaller than that of the second type cell, at least the measurement period in the first RRM measurement configuration information is larger than that in the second RRM measurement configuration information, or a measurement reporting period in the first RRM measurement configuration information is larger than that in the second RRM measurement configuration information.

5. The method according to claim 1, wherein the measurement period is a synchronization signal block based RRM measurement timing configuration (SMTC) period.

6. A terminal device, comprising: a processor, a transceiver and a memory, wherein the memory is configured for storing a computer program, the transceiver is configured to transmit or receive signals under control of the processor, and when the computer program stored in the memory is executed by the processor, the processor is caused to:

receive first information sent by a network device, wherein the first information comprises a first corresponding relationship or a second corresponding relationship, and the first information is used for instructing the terminal device to determine radio resource management (RRM) measurement configuration information according to the first corresponding relationship or the second corresponding relationship, wherein, the first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information; and determine the RRM measurement configuration information according to the first information;

wherein the processor is further caused to:

when the first information comprises the first corresponding relationship, determine the RRM measurement configuration information according to current mobile status information and the first corresponding relationship;

when the first information comprises the second corresponding relationship, determine the RRM measurement configuration information according to the channel quality information of a resident cell and the second corresponding relationship;

wherein the RRM measurement configuration information comprises a measurement period.

7. The terminal device according to claim 6, wherein the first corresponding relationship is determined by the network device according to a first rule, wherein, the first rule is specifically that: the network device configures first RRM measurement configuration information for a terminal device with a first moving speed and configures second RRM measurement configuration information for a terminal device with a second moving speed, wherein at least one of the following is met: the first moving speed is smaller than the second moving speed, at least the measurement period in the first RRM measurement configuration information is larger than the measurement period in the second RRM measurement configuration information, or a measurement reporting period in the first RRM measurement configuration information is larger than the second RRM measurement configuration information.

8. The terminal device according to claim 7, wherein the measurement period is a synchronization signal block based RRM measurement timing configuration (SMTC) period.

9. The terminal device according to claim 6, wherein the second corresponding relationship is determined by the network device according to a second rule, wherein, the second rule is specifically that: the network device configures first RRM measurement configuration information for a terminal device residing in a first type cell and configures second RRM measurement configuration information for a terminal device residing in a second type cell, and at least one of the following is met: channel quality of the first type cell is smaller than that of the second type cell, at least the measurement period in the first RRM measurement configuration information is larger than that in the second RRM measurement configuration information, or a measurement reporting period in the first RRM measurement configuration information is larger than that in the second RRM measurement configuration information.

10. The terminal device according to claim 6, wherein the RRM measurement configuration information further comprises:

at least one of a measurement time-frequency resource and a measurement reporting period.

11. A measurement method, comprising:

sending, by a network device, first information to a terminal device, wherein the first information comprises a first corresponding relationship or a second corresponding relationship, and the first information is used for instructing the terminal device to determine radio resource management (RRM) measurement configuration information according to the first corresponding relationship or the second corresponding relationship, wherein, the first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information;

wherein when the first information comprises the first corresponding relationship, the first information indicates the terminal device to determine the RRM measurement configuration information according to current mobile status information and the first corresponding relationship;

when the first information comprises the second corresponding relationship, the first information indicates the terminal device to determine the RRM measurement configuration information according to the channel quality information of a resident cell and the second corresponding relationship;

wherein the RRM measurement configuration information comprises a measurement period.

12. The method according to claim 11, wherein the RRM measurement configuration information further comprises:

at least one of a measurement time-frequency resource and a measurement reporting period.

13. The method according to claim 11, wherein the first corresponding relationship is determined by the network device according to a first rule, wherein, the first rule is specifically that: the network device configures first RRM measurement configuration information for a terminal device with a first moving speed and configures second RRM measurement configuration information for a terminal device with a second moving speed, wherein at least one of the following is met: the first moving speed is smaller than the second moving speed, at least the measurement period in the first RRM measurement configuration information is larger than the measurement period in the second RRM measurement configuration information, or a measurement reporting period in the first RRM measurement configuration information is larger than the second RRM measurement configuration information.

14. The method according to claim 11, wherein the second corresponding relationship is determined by the network device according to a second rule, wherein, the second rule is specifically that: the network device configures first RRM measurement configuration information for a terminal device residing in a first type cell and configures second RRM measurement configuration information for a terminal device residing in a second type cell, and at least one of the following is met: channel quality of the first type cell is smaller than that of the second type cell, at least the measurement period in the first RRM measurement configuration information is larger than that in the second RRM measurement configuration information, or a measurement reporting period in the first RRM measurement configuration information is larger than that in the second RRM measurement configuration information.

15. The method according to claim 11, wherein the measurement period is a synchronization signal block based RRM measurement timing configuration (SMTC) period.

16. A network device, comprising: a processor, a transceiver and a memory, wherein the memory is configured for storing a computer program, the transceiver is configured to transmit or receive signals under control of the processor, and when the computer program stored in the memory is executed by the processor, the processor is caused to:

send first information to a terminal device, wherein the first information comprises a first corresponding relationship or a second corresponding relationship, and the first information is used to instruct the terminal device to determine radio resource management (RRM) measurement configuration information according to the first corresponding relationship or the second corresponding relationship, wherein, the first corresponding relationship indicates a corresponding relationship between mobile status information of the terminal device and the RRM measurement configuration information, and the second corresponding relationship indicates a corresponding relationship between channel quality information of a cell where the terminal device resides and the RRM measurement configuration information;

wherein when the first information comprises the first corresponding relationship, the first information indicates the terminal device to determine the RRM measurement configuration information according to current mobile status information and the first corresponding relationship;

when the first information comprises the second corresponding relationship, the first information indicates the terminal device to determine the RRM measurement configuration information according to the channel quality information of a resident cell and the second corresponding relationship;

wherein the RRM measurement configuration information comprises a measurement period.

17. The network device according to claim 16, wherein the first corresponding relationship is determined by the network device according to a first rule, wherein, the first rule is specifically that: the network device configures first RRM measurement configuration information for a terminal device with a first moving speed and configures second RRM measurement configuration information for a terminal device with a second moving speed, wherein at least one of the following is met: the first moving speed is smaller than the second moving speed, at least the measurement period in the first RRM measurement configuration information is larger than the measurement period in the second RRM measurement configuration information, or a measurement reporting period in the first RRM measurement configuration information is larger than the second RRM measurement configuration information.

18. The network device according to claim 17, wherein the measurement period is a synchronization signal block based RRM measurement timing configuration (SMTC) period.

19. The network device according to claim 16, wherein the second corresponding relationship is determined by the network device according to a second rule, wherein, the second rule is specifically that: the network device configures first RRM measurement configuration information for a terminal device residing in a first type cell and configures second RRM measurement configuration information for a terminal device residing in a second type cell, and at least one of the following is met: channel quality of the first type cell is smaller than that of the second type cell, at least the measurement period in the first RRM measurement configuration information is larger than that in the second RRM measurement configuration information, or a measurement reporting period in the first RRM measurement configuration information is larger than that in the second RRM measurement configuration information.

20. The network device according to claim 16, wherein the RRM measurement configuration information further comprises:

at least one of a measurement time-frequency resource and a measurement reporting period.

* * * * *